United States Patent [19]

Lagerstedt et al.

[11] Patent Number: 4,580,392
[45] Date of Patent: Apr. 8, 1986

[54] METHOD AND AN APPARATUS FOR THE PROCESSING OF A MATERIAL WEB

[75] Inventors: Jan Lagerstedt, Malmö ; Esko Heinonen-Persson, Eslöv, both of Sweden

[73] Assignee: Tetra Pak International AB, Lund, Sweden

[21] Appl. No.: 482,262

[22] Filed: Apr. 5, 1983

[30] Foreign Application Priority Data

Apr. 13, 1982 [SE] Sweden ............................ 8202302

[51] Int. Cl.⁴ .................... B65B 9/00; B65B 9/06; B65B 7/06
[52] U.S. Cl. ..................................... 53/451; 53/552; 53/554; 53/373
[58] Field of Search ................ 53/551, 553, 554, 552, 53/451, 373

[56] References Cited

U.S. PATENT DOCUMENTS

| | | | |
|---|---|---|---|
| 2,294,215 | 8/1942 | Sonneborn et al. | 53/551 |
| 2,432,373 | 12/1947 | Bleam et al. | 53/551 |
| 2,826,021 | 3/1958 | Van Den Berg et al. | 53/551 |
| 3,449,888 | 6/1969 | Gausman | 53/182 |
| 3,583,126 | 6/1971 | McCullough | 53/551 |

FOREIGN PATENT DOCUMENTS

| | | |
|---|---|---|
| 2372728 | 6/1978 | France . |
| 336098 | 6/1971 | Sweden . |
| 1140057 | 1/1969 | United Kingdom . |

Primary Examiner—Leonidas Vlachos
Attorney, Agent, or Firm—Burns, Doane, Swecker & Mathis

[57] ABSTRACT

The invention relates to a method and an apparatus for the processing of a material web to convert the same to individual packing containers filled with contents. Flexible packing containers for milk or other beverages are manufactured from tubular material which is filled with contents, formed and divided to packing containers with the help of alternately working forming and sealing jaws which are given a reciprocating movement in the longitudinal direction of the tube and in the transverse direction of the tube. In accordance with the invention the jaws are guided and driven by guiding and driving rods which run parallel with the material tube and to which different reciprocating movements are imparted.

11 Claims, 5 Drawing Figures

METHOD AND AN APPARATUS FOR THE PROCESSING OF A MATERIAL WEB

BACKGROUND AND SUMMARY OF THE INVENTION

The present invention relates to a method and an apparatus for the processing of a tubular material web while it is fed through a packing machine, by sealing jaws arranged on both sides of the web and co-operating in pairs. The sealing jaws can be given a reciprocating movement in both the longitudinal direction of the material web and in the transverse direction of the material web.

Packing machines for the manufacture of non-returnable packages for milk or other liquid contents are known. The packing material in general consists of a flexible laminate which comprises layers of paper and thermoplastics and which is supplied to the packing machine in form of a web. The packing laminate is converted in the packing machine to a hose or tube in that the longitudinal edges of the laminate web are sealed to one another in a liquid-tight longitudinal joint. The laminate tube thus formed is filled with the desired contents while it is moved continuously downwards through the packing machine. Thereafter, the tube is sealed in a narrow transverse zone, with the simultaneous forcing out of the contents, by co-operating sealing jaws which are moved towards each other from opposite sides of the tube. As a result the tube is pressed together and the inner thermoplastic layers located opposite each other are made to fuse together through the simultaneous application of heat. The process takes place continuously with the help of two pairs of sealing jaws which alternately process the tube during a simultaneous downward movement and release the tube during an upward return movement. After sealing together and the consequent division of the material tube into individual, closed containers, the containers are separated from one another by cuts in the compressed and sealed zones.

In conjunction with the transverse sealing of the tube, a certain reshaping of the tube is performed in the sense that it is converted from its original, substantially circular cross-sectional shape to a more rectangular cross-sectional shape. This is done with the help of forming jaws connected with the sealing jaws which compress the tube from two sides so that it obtains the desired shape. After separation of the individual, filled and sealed packing containers from each other, a further form-processing usually takes place, so that they acquire a desired final shape, e.g. parallelepipedic.

In this known type of packing machine, the movement of the sealing jaws is guided with the help of several cams which are arranged in succession on a driving shaft located inside the frame of the machine. The driving shaft is connected to an electric driving motor. A number of different cams situated on the driving shaft are connected by a linkage and lever system with the jaws so that these can be given a reciprocating movement in accordance with a given pattern of movement. With the help of different cams, the jaws are moved upwards and downwards in the vertical direction along the longitudinal axis of the tube, and transversely in an opening and closing movement synchronized with the vertical movement. During the downward movement, the jaws are closed and thus press together to advance the material tube, whereas the upwards-directed return movement of the jaws takes place with the jaws in the open, folded out position. The movement of the jaws in the vertical direction is guided by means of fixed guide bars and the different driving movements are transferred with the help of complicated linkages, which make it necessary to provide a relatively large free space along the path of movement of the jaws. Beside this large space, the guiding and driving system also requires accurate adjustment in order to function correctly. However, owing to wear which inevitably arises after a certain period of operation, the inaccuracy of the driving arrangement increases again, and can be counteracted only be renewed adjustment and regular service.

It is an object of the present invention to provide a method of processing a material web which makes it possible to process tubular packing material while avoiding the disadvantages of the known methods.

It is a further object of the present invention to provide a method which makes it possible to continuously process and convert a packing material tube with great and lasting accuracy during a long period of operation.

It is also an object of the present invention to provide a method which simplifies the guiding and driving movements so that wear is minimized and the inaccuracies caused by the same are eliminated.

These and other objects have been achieved in accordance with the invention in that a method for processing a material web including the step of driving the sealing jaws with two driving rods located in parallel with the web. The first driving rod is imparted a reciprocating movement and the second driving rod is imparted a similar reciprocating movement which is superimposed on the movement of the first driving rod.

The method in accordance with the invention permits the guiding and the driving of the sealing jaws to take place by the same elements, namely a number of driving rods parallel with the packing material web which are moved in their longitudinal direction in accordance with a certain pattern of mutual movement. In this way, the space requirement reduced, the design is made simpler and cheaper and the effect of wear on the accuracy is diminished.

By directly connecting the sealing jaws to one another via hook-shaped members during the part of the manufacturing process which normally subjects the driving arrangement to the greatest loads, excessive stresses are avoided which reduces the risk of play and wear, and makes it possible to use smaller machine components.

It is also an object of the present invention to provide an apparatus for the processing of a tubular material web in accordance with the above-mentioned method with the apparatus not being affected by the disadvantages present in similar, previously known apparatus.

It is a further object of the present invention to provide an apparatus for the processing of a tubular material web having a compact design and including as few movable parts as possible.

It is a further object of the present invention to provide an apparatus which subjects the driving and guiding elements to minimum loads and which works with great accuracy even after long periods of operation.

These and other objects have been achieved in accordance with the invention in that an apparatus for the processing of a tubular material web includes sealing jaws arranged on both sides of the web and co-operating in pairs. The sealing jaws can be given a reciprocating movement in the longitudinal direction of the material web and in the transverse direction of the material web. The apparatus also includes a yoke wherein the co-operating jaws are suspended so that they can be swivelled and two parallel driving rods movable in the longitudinal direction of the material web. The first driving rod is connected to the yoke and the second driving rod is connected to the jaws.

Since the movement of the jaws is achieved and is guided by the driving rods parallel with the material web, the transmission of power occurs directly and requires little space. Because the guiding as well as the driving takes place by the said driving rods, only a small number of movable driving and guiding elements are present in the region of the machine which for reasons of hygiene, have to be subjected to frequent rinsing and cleaning.

BRIEF DESCRIPTION OF THE DRAWINGS

A preferred embodiment of the method as well as of the apparatus in accordance with the invention will now be described in more detail with special reference to the enclosed schematic drawings wherein like elements bear like reference numerals and wherein.

DETAILED DESCRIPTION OF A PREFERRED EMBODIMENT

Figure 1:
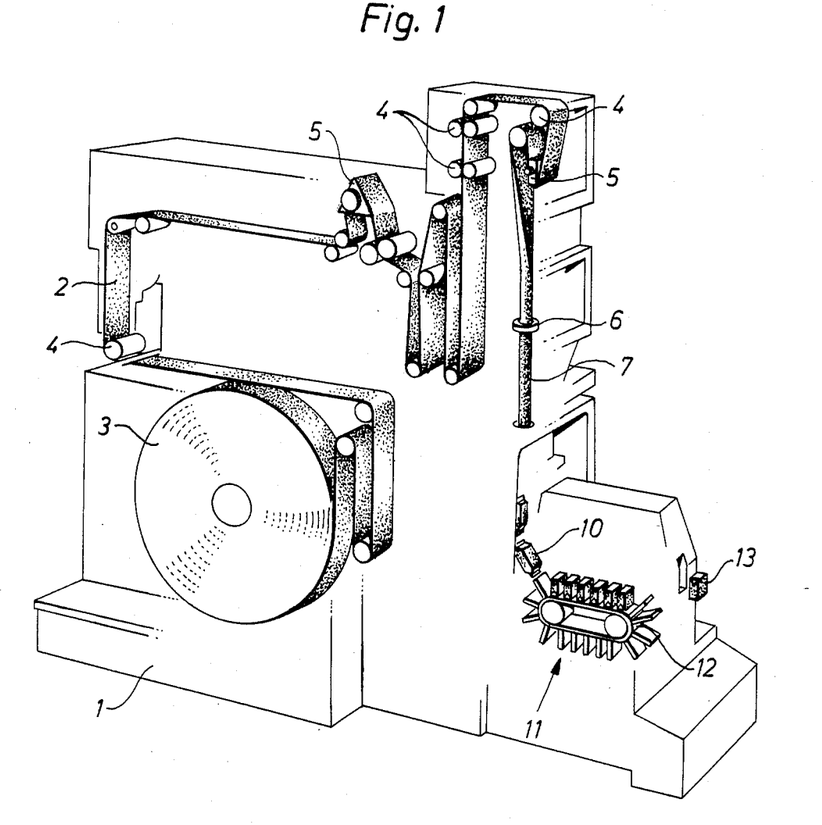
FIG. 1 is a schematic perspective view of the contours of a packing machine with the path of the material web through the machine being indicated.

The packing machine 1 shown in FIG. 1 includes in its lower, rear part (on the left in FIG. 1) a magazine wherein a packing material web 2 is located in the form of a roll 3. The packing material is a conventional packing laminate which includes a central carrier of paper, layers of aluminum foil and outside layers of liquid-tight and heat-sealable plastic material, usually polyethylene. From the magazine, the material web 2 runs via a number of reversing and guide rollers 4 to an upper part of the packing machine 1 where several processing stages of the web 2 take place, such as the fitting of the opening arrangements, impression of crease lines and sterilization. In the upper part of the machine, the material web 2 passes the register-holding device 5 which picks up transverse crease lines present in the material web and ensures that the processing of the material web takes place in register with the crease lines. After it has passed the upper part of the machine, the packing material web 2 is led vertically downwards along the front side of the machine (on the right in FIG. 1). At the same time, with the help of guide rollers (not shown) and a tube-forming device 6, a successive folding over of the material web to a tubular shape is carried out. As this is done, the two longitudinal edge zones of the material web are caused to overlap one another. With the help of a longitudinal joining element arranged on the tube-forming device 6 (not visible in FIG. 1), the two longitudinal edge zones are joined to each other so that a material tube 7 with a longitudinal, liquid-tight join is produced. While moving continuously downwards through the packing machine 1, the material tube 7 is filled with the desired contents. At the lower end of the tube, a processing or forming arrangement including sealing jaws 8 and forming flaps 9 (FIGS. 2-4) is provided which processes the packing material tube and converts it to filled and closed packing container blanks 10 which will be described in more detail in the following. The packing container blanks 10 so formed are separated subsequently from the material tube 7 and passed down into a final folder 11 located at the front end of the packing machine 1, where with the help of a conveyor 12 they are conducted past a number of processing stations in which a final form-processing of the packing container blanks 10 takes place. As a result ready-formed, substantially parallelepipedic packing containers 13 can be withdrawn from the packing machine and can be conveyed further for packaging in trays and transporting to the sales points.

The machine shown in FIG. 1 constitutes one example of a preferred type of machine on which a method and an arrangement in accordance with the invention can be used. Thus the packing machine 1 may also be of any other general design known previously, and the path of the packing material web 2 through the machine need not be that shown. It is essential only that the packing machine should work with packing material in the form of a coherent web 2, which is converted continuously to a tube 7 and is filled with contents and form-processed.

Figure 2:
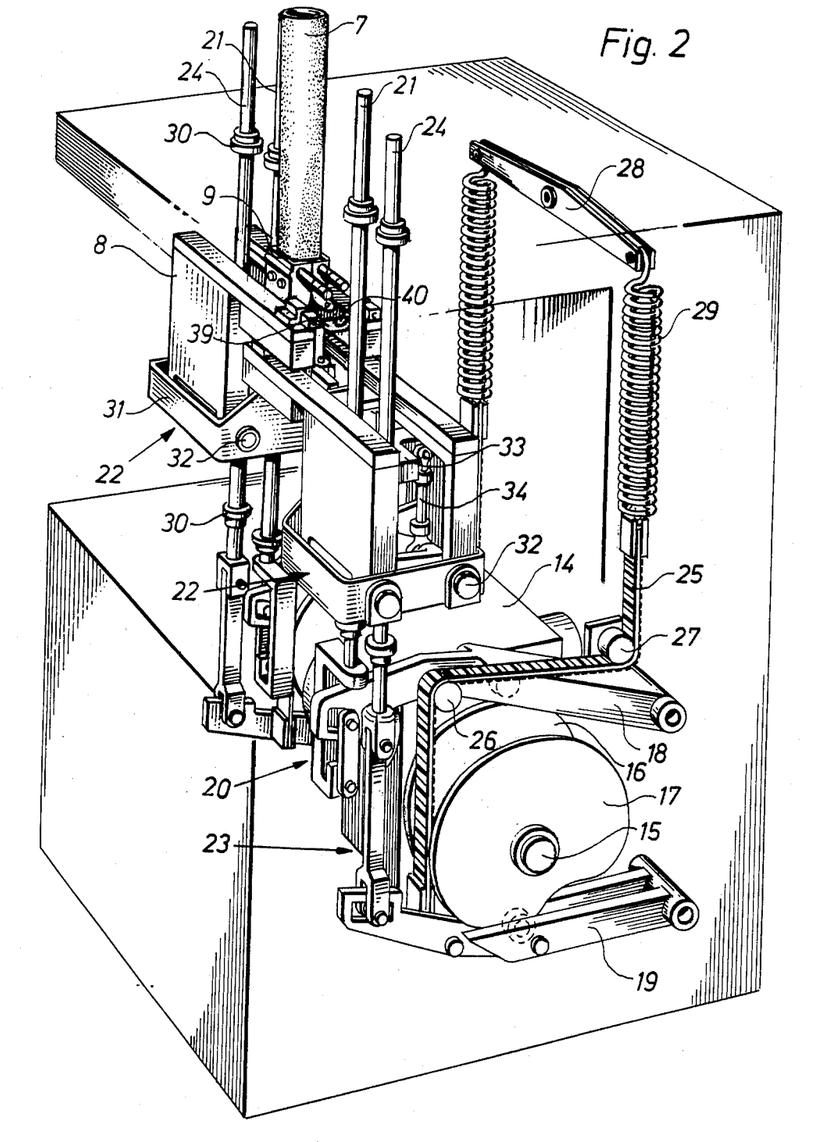
FIG. 2 is a schematic perspective view of the part of the packing machine according to FIG. 1 in which the conversion of the packing material tube to individual packing containers takes place.
Figure 3:
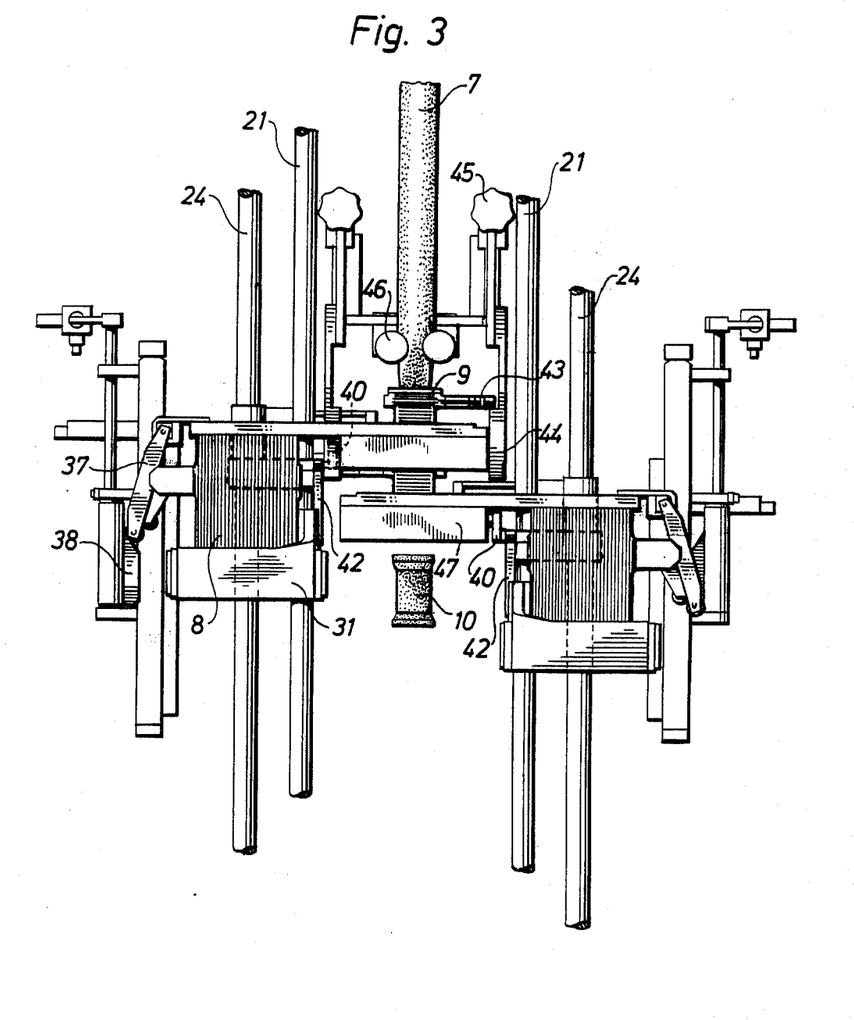
FIG. 3 is a front view of the part of the forming and processing arrangement shown in FIG. 2.

FIG. 2 illustrates, on a larger scale, a part of the packing machine 1 in accordance with the invention. The front part of the packing machine 1 includes an arrangement for the processing and forming of the material tube 7 moving vertically downwards through the machine. In the lower part of the packing machine 1, a motor and driving gear arrangement 14 is provided which drives a main driving shaft 15 extending horizontally through the machine. A number of radial cams are arranged on the driving shaft 15. In particular, a first radial cam 16 and a second radial cam 17 are arranged on the driving shaft 15. As can be seen in FIGS. 2 and 3, the machine in accordance with the invention includes a left and a right half which are identical but mirror-inverted. For the sake of clarity, the description will be concerned where appropriate with only one half of the machine, while it is understood that the opposite half of the machine is designed and works in a similar manner. Thus two sets of the cams 16,17 exist, and the arrangement on both sides of the motor and driving gear 14 is such that the first cam 16 is closest to the unit 14 whereas the second cam 17 is situated further out towards the end of the driving shaft 15, as can be seen clearly in FIG. 2.

Arms 18,19 are present above and below the cams 16, 17 which arms via cam rollers, rest against the cams 16,17 respectively. More particularly, the arm 18 is arranged above the first cam 16 and is supported at its end so that it can be swivelled about a swivelling axis running parallel with the main driving shaft 15. The arm 18 is connected at its free end via a linkage 20 to a first driving rod 21 extending vertically through the machine which in turn is connected to the forming unit 22 which will be described in more detail in the following.

The arm 19 rests against the second cam 17, similarly to the arm 18, and is supported at its end so that it can be swivelled about a swivelling axis extending parallel with the main driving shaft 15. The arm 19, however, is situated below the second cam 17, against which it rests via a pulley supported so that it is freely rotatable in the arm 19. At the front end of the arm 19 (on the left in FIG. 2) the arm 19, like the arm 18, is connected via a linkage 23 to a second driving rod 24 extending vertically through the machine.

A toothed belt or some other element 25 extends in front of the two arms 18, 19 and is adapted to take up tension force between an attachment on the lower arm 19 and a pulley 26 rotatably supported on the upper arm 18. From the pulley 26, which serves as a guide pulley for the toothed belt 25, the toothed belt extends past a further pulley 27 mounted on the upper arm 18 to one end of a lever 28, to which it is connected via a helical tension spring 29. On the opposite, mirror-inverted side of the machine, there is a similar toothed belt which in turn is connected via another spring to the other arm of the lever 28. With the help of the springs 29 and the lever 28, the toothed belt 25 exercizes a compressive force via the pulleys on the upper lever arm 18 and the attachment in the lower lever arm 19 which presses the two lever arms towards one another so that they rest against the cams 16 and 17 respectively. The different movements of the two lever arms 18,19 are taken up by the springs 29 and the lever 28, which because of the alternating manner of operation of the two machine halves will perform a rocking motion.

The arrangement of holding the two arms 18,19 in contact against the cams 16 and 17 respectively by spring-loaded elements 25 adapted to take up the tension force is very space-saving and operationally safe. Only the element taking up the tension force has to be present in the direct vicinity of the cams and the driving unit, while the spring unit 28,29 can be placed at some other suitable location in the machine. In the preferred embodiment, the two machine halves operating alternately can be coupled via different toothed belts to the same spring unit if the same is designed as a rocking lever 28. This results in a further space saving. As the same time, the alternating utilization of the spring devices 29 permits their size to be reduced by approximately 50%. At the same time, the spring characteristic is improved because of the shorter length of the springs.

Figure 4A:
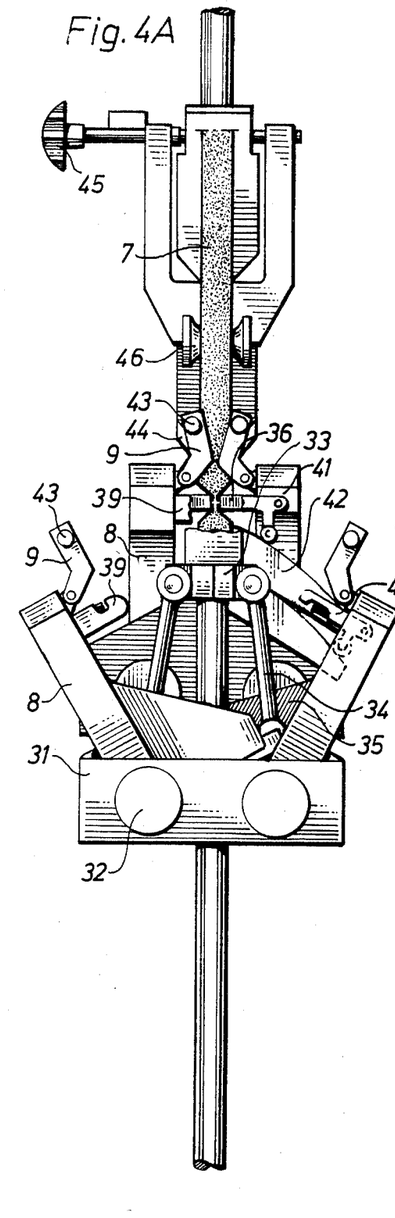
FIGS. 4A and 4B are side views of the arrangement according to FIG. 3 with the sealing jaws being shown in different processing positions.
Figure 4B:
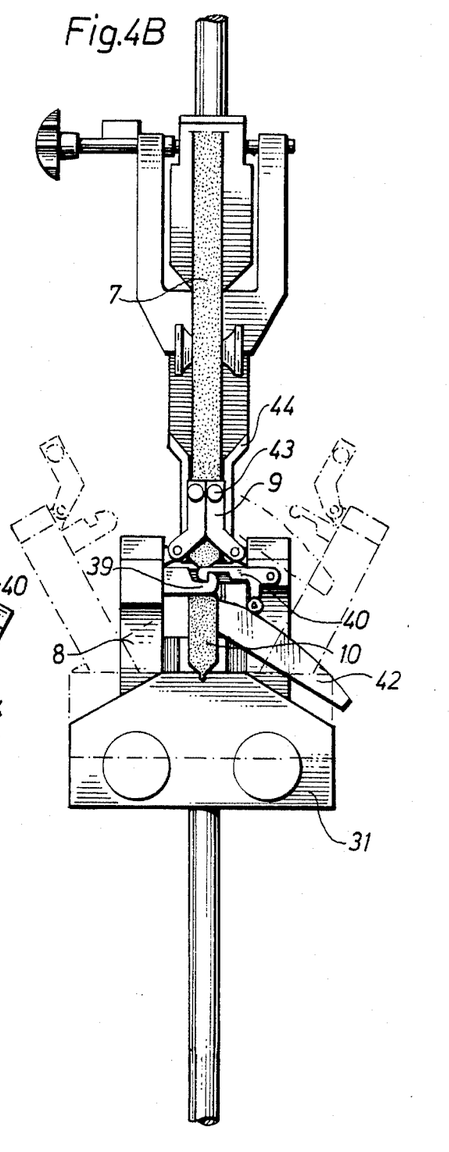

As mentioned earlier, the two arms 18,19 are connected by means of linkages 20 and 23 respectively to the vertical driving rods 21 and 24 respectively. The driving rods 21 and 24 are supported so that they can be moved in vertical direction in plain bearings 30 in the frame of the machine, and the two linkages 20,23 are designed so that they transmit the swivelling movement of the two arms 18,19 to the driving rods 21,24 without any sideways movement. This is made possible with the help of multi-articulated linkages which are, however, of a conventional type and do not, therefore, have to be described in detail in this context. The two mirror-inverted, alternately operating forming units 22 of the machine, as mentioned earlier, include among other things, sealing jaws 8 and forming flaps 9. Each forming unit 22, more particularly, includes a yoke 31 which on its one side is rigidly connected with the first driving rod 21 and is vertically displaceable in upward and downward direction with the help of the same. The second driving rod 24 extends through the yoke without being directly connected to the same. On either side of the two driving rods 21,24, the yoke is provided with bearing axles 32 for the two sealing jaws 8. The axles 32 extend at right angles to the driving rods 21,24 and are parallel with the main driving shaft 15 of the machine. The sealing jaws 8 can be swivelled about the axles 32 between an inactive outer or swivelled-out position and an active, swivelled-in position in which the sealing jaws 8 extend substantially parallel with the driving rods 21,24 (FIG. 4). The maneuvering of the sealing jaws 8, situated in a yoke 31 opposite each other, moves a bracket 33. From the bracket 33, links 34 extend downwards to arms 35 which project from lower parts of the sealing jaws 8 facing towards one another. As a result of this construction, the sealing jaws 8 remain stationary as long as the first and second driving rods 21 and 24 respectively are moved uniformly. In the event of any difference in the movement of the two driving rods 21 and 24, the bracket 33 moves vertically upwards or downwards in relation to the yoke 31 so that the sealing jaws 8 are swivelled about the bearing axles 32. The motion pattern of the arrangement will be described in more detail in the following.

Arms 47 project sideways from the upper parts of the two sealing jaws 8. The arms 47 are straight opposite one another and on either side of the material tube 7 extending vertically through the packing machine. The sides of the arms 47 facing one another support sealing bars 36 which extend transversely in relation to the packing material tube 7 (FIG. 4). The sealing bars 36 are adapted, in the active position of the sealing jaws 8, to press the packing material tube 7 together in a transverse zone. One of the two co-operating sealing bars 36 has two electric conductors situated at a distance from each other, which are adapted to heat the thermoplastic layers of the packing material in order to seal together the tube in transverse zones situated at some distance from one another. The sealing bars 36 are connected in a known manner to a suitable source of current.

A clipping device (not shown) operates between the two conductors of the sealing bar 36. The clipping device is activated when the sealing takes place and cuts off the packing material tube between the two transverse seals. The clipping device is of known design and is operated hydraulically by elements not shown in the drawing. Furthermore, volume flaps (not shown) are provided which affect the shaping of the packing containers and which are maneuvered mechanically with the help of push rods provided in the sealing jaws 8. The volume flaps are acted upon via a maneuvering arm 37 by a cam 38 supported in the frame of the machine when the vertical reciprocating movement of the sealing jaws is taking place.

On either side of the sealing bars 36 on the sealing jaws 8, hook-shaped members 39,40 are provided which in the active position of the sealing jaws 8 are joined to one another. During the pressing together of the tube and the sealing procedure, the hook-shaped members 39,40 provide the necessary strong pressure of the sealing bars 36 against each other. More particularly, one sealing jaw has a fixed hook-shaped member projecting at a right angle, whereas the opposite sealing jaw is provided with a hook-shaped member 40 which can be swivelled about an axis extending parallel with the main shaft of the machine, and is reciprocably movable by a piston and cylinder unit 41 arranged in the sealing jaw. The vertically pivoting movement of the hook-shaped member 40 is produced with the help of a cam 42 which projects sideways from the bracket 33 mounted on the second driving rod 24. The connection between the bracket 33 and the sealing jaw 8 via the links 34 and the arms 35 provides a transmission which is such that the upwards movement of the second driving rod in relation to the yoke 31 not only folds out the sealing jaws 8 from the active to the inactive position but also, via the cam 42, raises the hook-shaped member 40 from its engagement with the co-operating hook-shaped member 39. As the second driving rod 24 moves downwards in relation to the yoke 31, a swivelling of the sealing jaws 8 takes place in the opposite way, namely from the swivelled-out position shown in FIG. 4A to the swivelled-in or active position shown in FIG. 4B. At the same time the hook-shaped member 40 is lifted with the help of the hook cam 42 so that the engagement with the hook-shaped member 39 can take place without hindrance. After the engagement has been completed, the piston and cylinder unit 41 is activated, as a result of which the hook-shaped member 40 is pulled back into the sealing jaw 8 so that the desired compressive force is produced between the two sealing bars 36. The piston and cylinder unit 41 is kept activated during the whole sealing and clipping process and is released just before the swivelling out of the sealing jaws 8 to the inactive position is started.

Above the sealing bars 36 of the sealing jaws 8 are the forming flaps 9 mentioned earlier. Seen from above, the forming flaps 9 are of a substantially U-shaped cross-section, and together form a rectangular channel whose inside dimensions correspond to the outside dimensions required for the finished packing container. The two forming flaps 9 are suspended so that they can be swivelled about swivelling axes which are located a little above the sealing bars 36 and extend parallel with these. At the upper end of the forming flaps 9, axles with guide pulleys 43 project sideways which, during the downwards movement of the yoke 31, engage with forming flap cams 44 supported by the frame of the machine and guide the forming flaps 9 until they rest against one another from both sides of the packing material tube 7. The forming flaps 9 are spring-loaded in the direction away from the packing material tube 7 so that when the yoke 31 carries out its upwards return movement, they will be in a predetermined, swivelled-out position. The mutual position of the forming flaps, as mentioned earlier, determines the shape of the finished packing container and therefore also its volume. Consequently, an adjustment of volume can be carried out by sideways displacement of the forming flap cams 44. The cams 44 are suspended so that they can be swivelled in the frame of the machine, and are maneuverable in direction towards, or away from, each other by handwheels 45 for the adjustment of the volume of the packing containers.

During the operation of the machine, as mentioned earlier, the packing material web 2 is supplied in the form of a material roll 3 which is introduced into the rear end of the machine. From the material roll 3, the material web 2 runs past a number of reversing and guide rollers 4 and the register-holding device 5, which guide the web and ensure that the crease-line pattern or printed pattern of the web is in the correct position in relation to the processing operations which are carried out in the machine. The processing operations are partially of a conventional kind, such as the fitting of opening arrangements, printing of the date and forming and cutting off of finished packing containers. After the material web 2 has reached the front upper part of the packing machine (on the right in FIG. 1), the web is conducted vertically downwards while it is converted at the same time by the tube forming device 6 to a tube with overlapping longitudinal edges. The two longitudinal edges are sealed by means of a sealing device situated on the tube-forming device 6 so that the material tube 7 will be sealed in a completely liquid-tight manner. The ready-formed material tube 7 then continues further downwards to the part of the machine which processes the material tube and converts it into individual, filled packing containers. After the packing material tube 7 has passed a pair of co-operating guide rollers 46 which are on a level with the surface of the liquid column inside the packing material tube, the material tube comes into contact with one of the two forming units 22, which alternately process the tube. More particularly, one of the forming units 22, after it has been moved with the help of the first driving rod 21 to its upper dead center position (on the left in FIG. 3), will press together the packing material tube 7 in a transverse zone with the help of the sealing bars 36 of the sealing jaws. The vertical driving of the sealing jaws 8 is done by the first driving rod 21 which is rigidly connected to the yoke 31 and displaces the same in a reciprocating vertical movement whereby the sealing jaws 8 as well as the other parts joined to the yoke are moved. With the help of the second driving rod 24 the sealing jaws 8 are given a swivelling movement between their open, swivelled-out end position and the closed active position (FIG. 4). Since the driving rod 24 is connected via the bracket 33, the links 34 and the projecting arms 35 to the sealing jaws, a transverse pivoting movement will be imparted to them whenever the driving rods 21,24 move unequally. Thus the sealing jaws 8 are moved from their inactive position to their active position due to the second driving rod 24 being moved downward relative to the first driving rod 21 while the forming unit 22 is in its upper dead centre position. This movement swivels the arms 35 of the sealing jaws 8 downwards via the links 34 until the sealing bars 36 are passed against each other from both sides of the material tube 7.

In other words, it can be said that the swivelling movement of the two sealing jaws 8 is brought about because the second driving rod 24 coupled to the sealing jaws performs not only the same reciprocating movement as the driving rod 21 but also has a similar, reciprocating movement superimposed upon this movement. The resulting difference in movement between the two driving rods regulates the transverse movement of the sealing jaws so that during the greater part of their downwards movement they are in a folded-in active position. During the greater part of their upwards movement, the sealing jaws are in a folded-out, inactive position.

When the sealing jaws 8 are swivelled to their active position, the hook-shaped member 40 is lifted with the help of the hook cam 42 fitted on the bracket 33, so that the hook-shaped member 40 in the active position of the jaws engages the hook-shaped member 39. Immediately after the engagement, the piston and cylinder unit 41 connected to the hook-shaped member 40 is activated through the supply of hydraulic fluid so that the hook-shaped member is pulled backwards into the sealing jaw 8, which causes a predetermined, correct contact pressure between the two sealing bars 36. The relatively high pressure required is thus taken up wholly by the hook-shaped members 39,40 which largely relieve the sealing jaws 8 and their mounting. This is advantageous for the construction as well as for operational safety. The tension force of the hooks 39,40 is maintained during the downward movement of the yoke 31 so that the sealing jaws are pressed together with a predetermined contact pressure during a certain part of the time they are in closed position. In this way it is ensured that any contents present in the sealing zone are completely forced out, while simultaneously promoting a good contact between the laminate surfaces which are to be sealed together and a satisfactory heat transfer.

After the yoke 31 has left its upper dead center position, the two forming flaps 9 with their guide pulleys 43 will run into the forming flap cam 44 which, against the effect of the spring force of the forming flaps, causes the forming flaps to be moved so that they lie against each other and convert the part of the packing material tube 7 located between the flaps to a mainly rectangular cross-sectional shape which corresponds to the desired cross-sectional shape of the ready-formed package. The position of the forming flaps 9 and the compressive force can be regulated by sideways movement of the forming cams 44 which is done with the help of the volume handwheel arranged at the upper point of suspension of the cams 45.

After the yoke 31 with the help of the first driving rod 21 has been moved downwards a certain distance, the maneuvering arm 37 for the volume flap (not shown in the drawing) comes into contact with the cam 38 fitted in the frame which results in the volume flap being urged into its desired position. At the same time the hydraulic cylinder for the cutting device is activated, which causes it to cut off the material in the compressed area between the two seals produced by the sealing bars.

At the same time as the forming unit 22 is moved downwards while drawing forth and sealing the packing material tube 7, the opposite, mirror-inverted forming unit 22 moves upwards. Owing to an appropriate positional relationship between the two driving rods 21,24 it is ensured, moreover, that the sealing jaws 8 are in folded-out position, so that the projecting arms 47 of the sealing jaws can pass unhindered outside the activated arms 47 on the opposite forming unit which move downwards at the same time.

When the forming unit 22 in question approaches its lower dead center position, the hydraulic fluid supply to the piston and cylinder unit 41 is shut off so that the tension force of the hooked member 40 ends and the compressive force between the two sealing bars 36 eases. Through maneuvering of the second driving rod 24 and moving it in upward direction in relation to the first driving rod 21, the bracket 33 and the hook cam 42 connected to it are lifted, which means that the hook-shaped member 40 is released from engagement with the hook-shaped member 39 at the same time as the swivelling out of the sealing jaws from the active to the inactive position commences. At the same instant, the guide pulleys 43 of the two forming flaps 9 also have left the lower end of the forming flap cam 44, and the forming flaps 9, because of their spring-loading, have been moved to their swivelled-out outward-directed position. When the sealing jaws 8 have attained their swivelled-out inactive position, the relative movement between the two driving rods 21,24 ends and they start at the same time to be moved upwards, which means that the forming unit 22 with the sealing jaws 8 in swivelled-out position is moved upwards. The arms 47, as mentioned earlier, can pass without hindrance the active, downwards moving arms 47 of the opposite forming unit 22.

The procedure described is repeated continuously during the operation of the machine and the two forming units alternately process and draw forth the packing material tube 7. When the sealing jaws 8 at the lower end of the working stroke of the forming unit open and release the packing material tube, the newly formed packing container blank 10 drops down under its own weight to the final folder 11 where the corners of the substantially cushion-shaped blank are folded in so that parallelepipedic packing containers 13 are produced.

The design of the sealing bars 36 can be varied depending on the type of packing material used. Usually a packing material of the laminate type is used, which comprises layers of fibrous material, usually paper, and thermoplastic outer layers. Given this type of material, the sealing bars 36 appropriately comprise electric resistance wires which during the sealing are connected to a source of current. In the manufacture of aseptic packing containers, that is to say packing containers for sterile contents with long keeping properties, a packing laminate is used which beside layers of papers and thermoplastics also includes layers of metal foil. In the case of such material the sealing bars 36 may include an electric conductor in the working surface which can be connected to an electric a.c. source. During sealing a magnetic field is induced in the metal foil of the packing laminate straight opposite the sealing bars. This magnetic field, because of losses arising in the aluminum foil, heats the foil as well as the adjoining thermoplastic layer so that they are heat-sealed to one another.

The method and the apparatus in accordance with the invention make it possible to carry out within a very limited space the processing and the conversion of the packing material tube filled with contents. Due to the absence of external links for the transmission of power and motion to the forming units, the forming units can be given a very compact design. The absence of complicated linkage arrangement in the forming area is a further important advantage especially in aseptic machines, since the necessary and frequently occurring rinsing and cleaning operations of the forming units can be carried out without exposing the driving unit and the bearings and points of lubrication of the same to cleaning agents.

Since the whole driving unit is outside the so-called rinsing zone, a long life combined with a low consumption of lubricant is assured.

Through the utilization of the vertical driving rods both as guides for the control of the movement of the forming units and as rods for the transmission of the drive the design is made particularly simple and operationally safe compared with similar arrangements known previously.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A method for the processing of a continuous material web as the web is fed through a packing machine, comprising the steps of:
   advancing said web continuously while forming said web into a tube;
   advancing said tube between opposed sealing jaws, said sealing jaws cooperating in pairs and being moved by first and second driving rods located parallel to the web;
   providing a pair of forming units including said sealing jaws, a yoke member and forming flaps;
   connecting each pair of said forming unit to said yoke member and rigidly connecting said yoke member with said first driving rod;
   imparting a reciprocal movement to said yoke member by the first driving rod;
   imparting a similar reciprocal movement to the second driving rod, the movement of said first and second driving rods imparting a reciprocal movement to the sealing jaws in a longitudinal direction and in a transverse direction of the material web;
   regulating the transverse movement of the sealing jaws so as to determine an inactive position and an active position of the sealing jaws;
   providing a pair of hook members for pressing the sealing jaws against the tube in the active position of the jaws;
   swiveling the sealing jaws from the active position to the inactive position by a cooperating cam interconnected with one of said pair of hook members and the second driving rod; and
   pressing the sealing jaws against the tubular web and sealing the tubular web during a predetermined part of the transverse reciprocal movement.

2. The method in accordance with claim 1, including moving the two driving rods with respect to each other so as to define a mutual difference in movement between the two driving rods, regulating the transverse movement of the sealing jaws by said mutual difference in movement so that the sealing jaws are in the active position during part of the longitudinal movement in one direction and in the inactive position during part of the longitudinal movement in an opposite direction.

3. The method in accordance with claim 2, wherein the hook members press the sealing jaws against the tube by applying a force during a predetermined time in which the jaws are in the active position.

4. The method in accordance with claim 1, further including the step of clamping and retaining the tubular material web between the sealing jaws in the active position by the pressing of the sealing jaws during the sealing of the tubular web.

5. A packing machine processing a tubular material web, comprising:
   a machine frame;
   a plurality of guide means forming said tubular material web;
   a drive mechanism provided so as to advance said web and seal a portion thereof, said mechanism including a yoke device connected to said sealing jaws, two parallel driving rods and sealing jaws actuated by said yoke device and the driving rods;
   said sealing jaws arranged on both sides of the web and cooperating in pairs, said drive mechanism imparting a reciprocating movement to said yoke device by reciprocating one of the driving rods, said drive mechanism also imparting a swivel movement to said sealing jaws by movement of the other of the driving rods;
   said two parallel driving rods connected to said drive mechanism so as to be provided with movement in a direction longitudinal to the direction of advancement of the material web, a first driving rod of the two parallel rods connected to the yoke so as to impart said reciprocating movement, a second driving rod of the two parallel rods connected to the sealing jaws so as to impart said swivel movement;
   two hook-shaped members connected to said jaws, one of said hook-shaped members swivelled between an active position and an inactive position by a cam element fixed to the second driving rod; and
   said drive mechanism driving the driving rods to impart two directions of movement to the sealing jaws, a first direction of movement being a reciprocal movement in said longitudinal direction of the web and a second direction of movement being in a transverse direction of the web, said sealing jaws contacting the tubular web during a portion of said transverse reciprocal movement to provide a seal in the web.

6. The apparatus of claim 5, further including a hydraulic piston and cylinder unit connected to said yoke device, said one hook-shaped member connected to said hydraulic piston and cylinder unit so as to be moved by said unit in a transverse direction of the material web.

7. The apparatus in accordance with claim 5 further including forming flaps and means for mounting the forming flaps on said sealing jaws, the sealing jaws being provided with said forming flaps at an upper end thereof, the forming flaps movable in a transverse direction of the material web, said means for mounting the forming flaps permitting the forming flaps to be swivelled and so that during the forming of the tubular packing material web the forming flaps are pressed against each other by cam means fitted in the frame of the machine.

8. A packing machine apparatus for driving sealing jaws of a packing machine for the processing of a tubular material web, comprising:
   a machine frame which provides support for elements of the machine, including:
   sealing jaws arranged on both sides of the web, said sealing jaws cooperating in pairs, and
   means for imparting a reciprocating movement to the sealing jaws in a longitudinal and a transverse direction of the material web, said means including
   first and second drivable cams connected to a said packing machine;
   motor means for driving the first and second cams;
   cam rollers resting against said cams;
   an arm connected to each of said cam rollers, said arms being movable in response to the driving of said first and second cams;
   an element adapted to take up a tension force, a portion of said element extending between the arms, said element being firmly connected to one arm and movably connected to the other arm said element including a belt and a guide pulley, said belt in engagement with said guide pulley, said guide pulley rotatably mounted on the other arm;
   a spring unit connected to a remaining portion of said element, said spring unit urging said arms against said cams whereby the movement of said arms is transmittted by said imparting means to the sealing jaws.

9. The driving apparatus in accordance with claim 8, wherein the force of the spring unit acting through the belt presses the cam rollers of the two arms against the respective cams.

10. The driving apparatus in accordance with claim 8 wherein the spring unit is suspended in the frame of the machine and is provided with a spring device for loading the element adapted to take up tension force.

11. The driving apparatus in accordance with claim 10, wherein the packing machine has two identical, alternately operating pairs of sealing jaws driven by two corresponding pairs of drivable cams, the spring unit is in the form of a double-armed lever pivotally suspended at its center in the frame of the machine, two separate elements adapted to take up tension force are connected to movable arms for each pair of cams, and a spring device extends between each end of the lever and each element.

* * * * *